US009331887B2

(12) United States Patent
He et al.

(10) Patent No.: US 9,331,887 B2
(45) Date of Patent: *May 3, 2016

(54) PEER-AWARE RANKING OF VOICE STREAMS

(75) Inventors: Li-wei He, Redmond, WA (US); Dinei A. Florencio, Redmond, WA (US); Xun Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2547 days.

This patent is subject to a terminal disclaimer.

(21) Appl. No.: 11/277,932

(22) Filed: Mar. 29, 2006

(65) Prior Publication Data

US 2007/0230372 A1 Oct. 4, 2007

(51) Int. Cl.
*H04L 12/16* (2006.01)
*H04L 29/06* (2006.01)
*H04L 12/66* (2006.01)

(52) U.S. Cl.
CPC .......... *H04L 29/06027* (2013.01); *H04L 12/66* (2013.01); *H04L 65/403* (2013.01); *H04L 65/4038* (2013.01)

(58) Field of Classification Search
CPC ... H04L 65/403; H04L 12/1827; H04L 12/18; H04L 12/1822; H04L 65/1083; H04M 3/56; H04M 3/22; H04M 3/567; H04M 2203/5009; H04M 2203/5054; H04M 2203/5072; H04M 2242/06; H04M 3/002; H04M 3/568; H04M 9/02; H04M 15/8072
USPC ......... 370/260–261, 201, 262, 266, 270, 286, 370/289; 379/39.21, 158, 202.01, 392.01, 379/406.01
See application file for complete search history.

(56) References Cited

U.S. PATENT DOCUMENTS

| | | | |
|---|---|---|---|
| 6,707,826 B1 * | 3/2004 | Gorday et al. | 370/468 |
| 7,203,643 B2 * | 4/2007 | Garudadri | 704/233 |
| 7,881,235 B1 * | 2/2011 | Arthur et al. | 370/261 |
| 2001/0053132 A1 * | 12/2001 | Attimont et al. | 370/260 |
| 2002/0075856 A1 * | 6/2002 | LeBlanc | G10L 25/78 370/352 |

(Continued)

OTHER PUBLICATIONS

Elad, M., Y. Hel-Or and R. Keshet, Pattern detection using a maximal rejection classifier, Pattern Recognition Letters, Oct. 2002, pp. 1459-1471, vol. 23, No. 12.

(Continued)

*Primary Examiner* — Melanie Jagannathan
*Assistant Examiner* — Najeebuddin Ansari
(74) *Attorney, Agent, or Firm* — Steve Wight; Cassandra T. Swain; Micky Minhas (57) ABSTRACT

A peer-aware voice stream ranking method that makes decisions based on information about participants of a voice conference over a network. Whether to send a participant's own audio packet out on the network is based both on information about the participant's own voice packet and voice packets that the participant receives from other clients. A Voice Activity Score (VAS) is computed for each frame of a particular voice stream. The VAS includes a voiceness component, indicating the likelihood that the audio frame contains speech or voice, and an energy level component that indicating the ratio of current frame energy to the long-term average of energy for a current speaker. Using the VAS from the participants, the method also ranks the client's voice stream as compared to other clients' voice streams in the voice conference. If there are participants higher ranking, the client's voice stream is not sent.

20 Claims, 7 Drawing Sheets

(56) References Cited

U.S. PATENT DOCUMENTS

| | | | |
|---|---|---|---|
| 2003/0063572 A1* | 4/2003 | Nierhaus et al. | 370/260 |
| 2003/0179888 A1* | 9/2003 | Burnett et al. | 381/71.8 |
| 2003/0198193 A1* | 10/2003 | Li | 370/260 |
| 2003/0198328 A1* | 10/2003 | Li | 379/202.01 |
| 2004/0158614 A1* | 8/2004 | Williams | 709/207 |
| 2005/0237931 A1* | 10/2005 | Punj et al. | 370/229 |
| 2006/0055771 A1* | 3/2006 | Kies | H04L 12/1822 348/14.03 |
| 2006/0126538 A1* | 6/2006 | Krstulich | 370/260 |
| 2006/0149558 A1* | 7/2006 | Kahn et al. | 704/278 |
| 2006/0244818 A1* | 11/2006 | Majors et al. | 348/14.08 |
| 2006/0247927 A1* | 11/2006 | Robbins et al. | 704/225 |
| 2007/0133435 A1* | 6/2007 | Eneroth et al. | 370/260 |
| 2007/0136420 A1* | 6/2007 | Palma et al. | 709/204 |

OTHER PUBLICATIONS

Smith, P. J., Voice conferencing over IP networks, Master's thesis, Jan. 2002, McGill University, Montreal, Canada.

Smith, P. J., P. Kabal and R. Rabipour, Speaker selection for tandem-free operation VOIP conference bridges, Proc. IEEE Workshop Speech Coding, Oct. 2002, pp. 120-122.

Smith, P. J., P. Kabal, M. L. Blostein, R. Rabipour, Tandem-free VoIP conferencing: A bridge to next-generation networks, Communications Magazine, May 2003, pp. 136-145, vol. 41, No. 5, McGill Univ., Montreal, Que., Canada.

He, L.-W., D. Florencio, Y. Rui, Decentralized architecture and protocol for voice conferencing, Microsoft Patent U.S. Appl. No. 11/277,905, filed Mar. 29, 2006.

* cited by examiner

PEER-AWARE RANKING OF VOICE STREAMS

BACKGROUND

Voice over Internet Protocol (VoIP) enables use of the Internet as a transmission medium for telephone calls instead of using the traditional Public Switched Telephone Network (PSTN). VoIP sends voice data in packets using the Internet Protocol (IP). Voice data for each call participant is contained in a voice stream. VoIP is quickly gaining popularity due to the proliferation of broadband connections to homes and the availability of low-cost hardware and software. Despite the rise in popularity, in order to compete with PSTN, VoIP must provide the functionality offered by PSTN, such as multi-party voice conferencing.

Multi-party voice conferencing is a conference between multiple participants in which voice data is transmitted to each participant. The participants often are located at different sites. For a PSTN voice conference, each participant's telephone is connected to a central bridge, which sums all of the voice signals and transmits the voice sum back to the participants. When migrating to VoIP, however, various problems arise with this central bridge-based architecture. A VoIP voice conference transmits the voice data of each participant over a wide-area network (such as the Internet), and each participant is connected to the network using a client. The Internet, however, introduces variable delays and packet losses into the network transmission process. Another problem is that the central bridge-based architecture places a high demand on the central bridge. In particular, the central bridge must decode the clients' voice packets, sum them, compress, and send summed and compressed voice packets back to each client. Because each client requires his own voice to be subtracted from the sum, the packet compression usually has to be done separately for each individual client. Because of these problems, the load on the bridge increases linearly to the number of clients that are connected to the bridge.

In order to reduce the load on the bridge, silence suppression is commonly used. Silence suppression reduces the bridge load by limiting the number of packets sent to the bridge. One way to accomplish this goal is to only send packets when actual speech is detected. This means that the bridge only receives and mixes packets that contain actual voice. Theoretically, therefore, the cost on the bridge is reduced substantially. In practice, however, the net savings from silence suppression techniques depends heavily on external factors such as microphone quality, the microphone's position relative to the user's mouth, the gain of the sound card, and the level and type of background noise. Since many of these factors are not controllable by the bridge, it is forced to reserve a significant amount of resources to deal with the worst case scenario of being flooded by incoming packets. This tends to negate at least some of the cost savings achieved by using silence suppression techniques.

In traditional silence suppression techniques, the client makes a decision whether to send its own voice packet out on the network. This decision is based on the results of a speech/silence test of the client's own audio signal containing voice packets. The speech/silence test examines the client's voice packet and determines the level of voice activity contained therein. The results of this speech/silence test then are compared to a fixed threshold. Based on this examination of its own audio signal, the client determines whether to send its packet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The peer-aware voice stream ranking method includes a silence suppression technique that takes into account and makes decisions based on information about other participants of a voice conference. Unlike traditional silence suppression, a decision whether to send or not send a client or participant's own audio packet is based not only on the client's own speech/silence test, but also on the level of voice activity of the packets that the client is currently receiving from the other clients or participants. In other words, a client using the peer-aware voice stream ranking method makes a decision based on both information about the client's own voice packet and voice packets that the client is receiving from other clients.

In one embodiment, the peer-aware voice stream ranking method ranks the relative importance of voice streams from each participant in a multi-party real-time voice conference. There are many situations when relative importance of each voice stream is needed or desirable. For example, in an audio bridge or multipoint control unit (MCU) mixer, the dominant speaker's packet arrival can be used to trigger the mixing operation in order to reduce perceived delay. The peer-aware voice stream ranking method can be used to rank the current speakers to determine the dominant speaker. In addition, the peer-aware voice stream ranking method can be used to rank speakers in a voice conference such that only the top M speakers are allowed to send their voice packets.

The peer-aware voice stream ranking method includes a technique to compute a Voice Activity Score (VAS) for each frame of a particular voice stream. The VAS includes two components: (1) a voiceness component that indicates the likelihood that the audio frame contains speech or voice; and (2) an energy level component that indicates the ratio of current frame energy to the long-term average of energy for a current speaker. The Voice Activity Scores then are filtered and ranked. The speakers, who are currently in the set of dominant or sending speakers, are given an advantage (known as a barge-in value) to reduce the number of changes to the speaker set.

One advantage of the peer-aware voice stream ranking method is that the client sends fewer packets so bandwidth utilization is more efficient on both the client and the bridge. In addition, another advantage of the peer-aware voice stream ranking method is that it offloads some CPU processing from the bridge. Moreover, in one embodiment of the peer-aware voice stream ranking method, since the number of concurrent speakers is known, packets from different speakers can be encoded at different bit rates depending on the speaker's ranking. The peer-aware voice stream ranking method can be applied to a variety of network topologies (such as full mesh, bridge-based, or a hybrid of the two), thereby allowing the benefits of the peer-aware voice stream ranking method to be applied to a wide variety of voice conferencing scenarios.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of the peer-aware voice stream ranking method, reference is made to the accompanying drawings, which form a part thereof, and in which is shown by way of illustration a specific example whereby the peer-aware voice stream ranking method may be practiced. It is to be understood that other embodiments may be utilized and structural changes may be made without departing from the scope of the claimed subject matter.

I. Operational Overview

Figure 1:
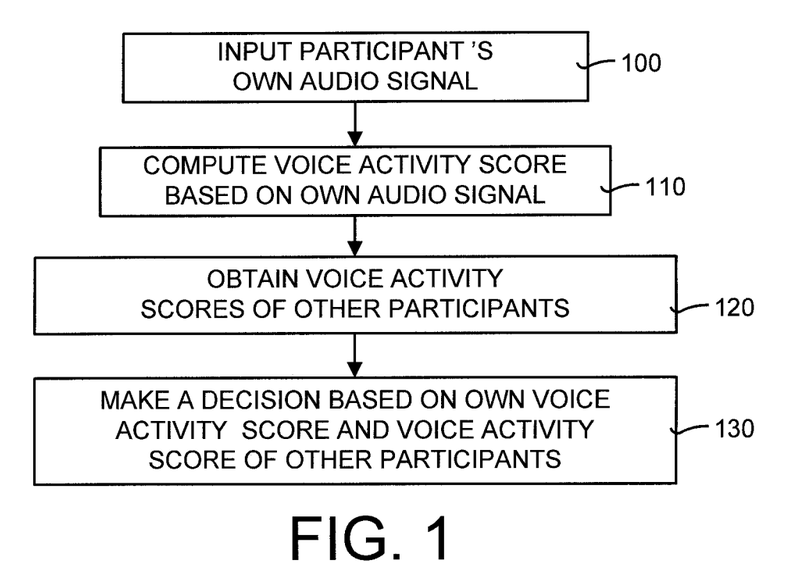
FIG. 1 is a general flow diagram illustrating the general operation of the peer-aware voice stream ranking method.

FIG. 1 is a general flow diagram illustrating the general operation of the peer-aware voice stream ranking method. In general, the peer-aware voice stream ranking method uses a client to make a determination based on information from both the client itself and other participants or clients on the network. More specifically, as shown in FIG. 1, the peer-aware voice stream ranking method begins inputting a participant's own audio signal (box 100). Next, a determination is made as to whether the client's own audio signal contains voice activity. This is achieved by computing a Voice Activity Score (VAS) based on the client's own audio signal (box 110).

The voice activity scores of the other participants or clients on the network then are obtained (box 120). In one embodiment, each client on the network computes its own VAS based on its individual audio signal. This VAS then is encapsulated in outgoing packets sent by that client. The VAS of each client then may be sent out over the network, and it is received by the other clients. It should be noted that a client may not always receive information (such as a VAS) from every client on the network. For example, one client may not be sending its packets because its ranking is too low. Finally, a decision is made based on the client's own VAS and the scores received from other participants (box 130). By way of example, this decision may include whether to send the client's voice signal out on the network.

In one embodiment the peer-aware voice stream ranking method determines whether a client should sent its voice stream and ranks the client's voice stream compared to other clients' voice streams. When determining whether the voice stream should be sent, the peer-aware voice stream ranking method takes into account not only the client's voice stream but also voice streams of the other participants that the client is receiving. If no voice activity is detected, then the client's voice stream is not sent. Moreover, in another embodiment, a client voice stream is not sent if there are M existing speakers with higher priority, where M is the maximum number of speakers allowed at any time. In other words, the client's voice stream is not sent if there is no chance of being heard.

II. Operational Details

Figure 2:
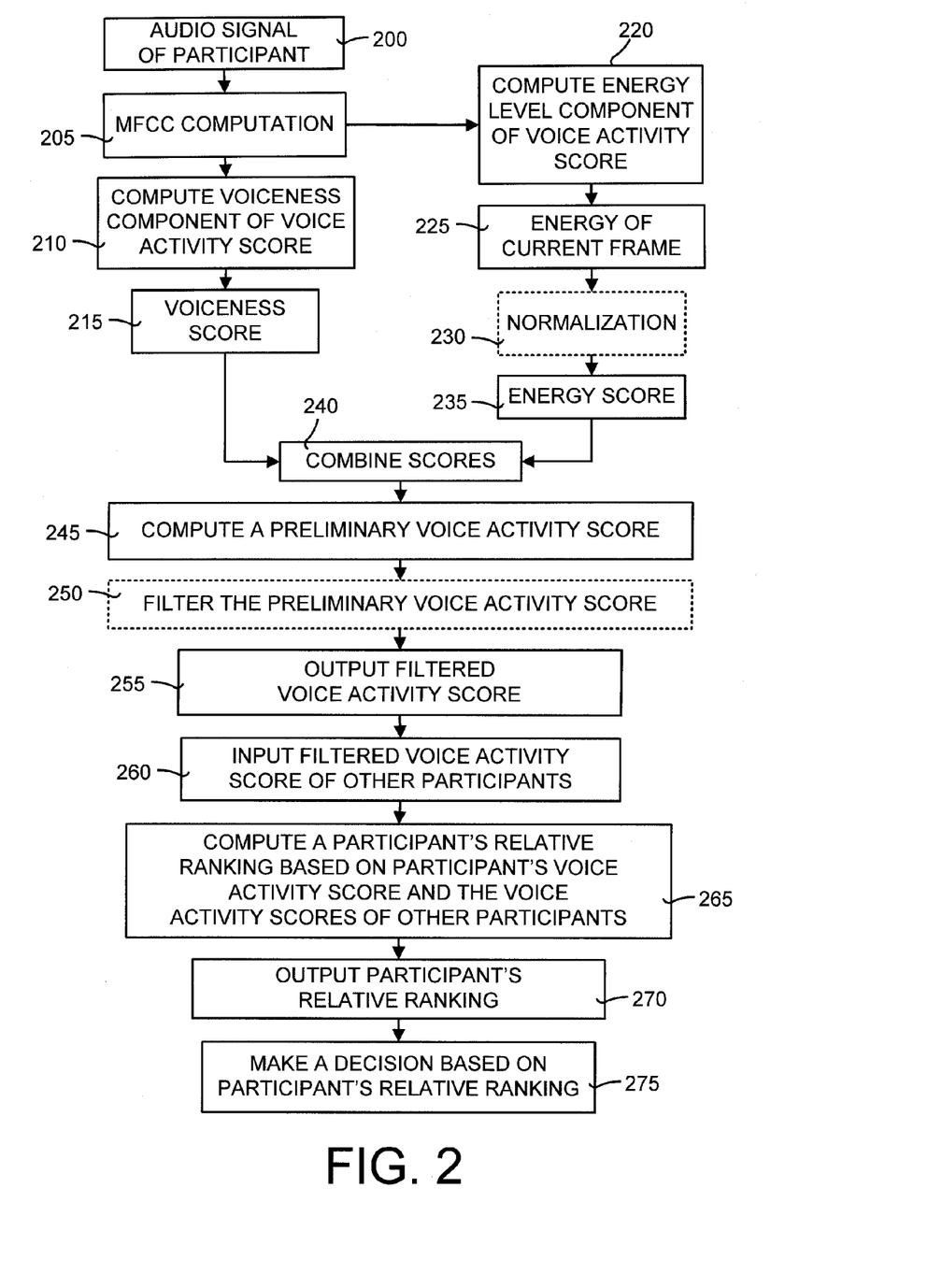
FIG. 2 is a detailed flow diagram illustrating the further details of the peer-aware voice stream ranking method shown in FIG. 1.

FIG. 2 is a detailed flow diagram illustrating the further details of the peer-aware voice stream ranking method shown in FIG. 1. The client performing the analysis inputs its own audio signal (box 200). In one embodiment, computation of the client's VAS then is computed as follows. For each audio frame of the audio signal, a Mel-Frequency Cepstral Coefficients (MFCC) computation is performed on the audio signal (box 205). The MFCC results are used to compute the voiceness component of the VAS, and to determine whether each audio frame is classified as "voice" or "noise" (box 210). The result is a voiceness score that indicates the likelihood that the audio frame contains speech or voice (box 215).

The MFCC computation also contains energy data that is used to compute the energy level component of the VAS (box 220). The details of this computation are discussed below. In general, however, the energy of a current frame is obtained from the MFCC computation (box 225). Next, in an alternate embodiment, the current frame energy is normalized using the long-term average of energy for a current speaker (box 230). This normalization is explained in detail below. As indicated by the dashed lines of box 230, the normalization process is optional. The output is the energy score, which indicates the ratio of current frame energy to the long-term average of energy for a current speaker (box 235).

The voiceness score and the energy score then are combined (box 240). The result of the combination is a preliminary VAS (box 245). In an alternate embodiment, the preliminary VAS is filtered (box 250). This filtering process is described in detail below. As indicated by the dashed lines of box 250, the filtering process is optional. If filtering is performed, then the output is a filtered VAS (box 255). The filtered VAS of each of other participants is obtained and used (box 260). More specifically, a relative ranking of the participant is computed based on the VAS of the participant and the VAS of other participants (box 265). The participant's relative ranking is output (box 270), and a decision is made based on the participant's relative ranking (box 275). By way of example, decisions that may be made may include whether to send a packet or how much bandwidth to allot to each participant based on the participant's ranking.

As noted above, the voice activity score (VAS) includes two components. A first component includes the voiceness component, which indicates the likelihood that the audio frame contains speech or voice. The second component includes the energy level component, which indicates the ratio of current frame energy to the long-term average of energy for a current speaker. The calculation of each component now will be discussed.

Voiceness Component Calculation

A natural choice for the quantity measuring the voice activity of an audio frame is its energy. Quantifying voice activity with frame energy involves the assumption that background noises have a much lower energy level as compared to voice. However, this assumption is not always valid. For example, a user may use a cheap microphone having a low signal-to-noise ratio (SNR) and capture many environmental noises. Furthermore, some noises (such as a user's breathing) have a high-energy level. Therefore, many noises cannot be well discriminated from true voice by considering only frame energy.

The voiceness component of the VAS can be computed in a variety of ways. In a one embodiment, the peer-aware voice stream ranking method uses a pattern classification based method to calculate a quantity that is able to identify voice frames robustly, even in the existence of various noises with high-energy levels. In particular, for this embodiment, the voiceness component of the VAS is computed as follows. For each audio frame, the MFCC (a 13-dimension vector) and their $1^{st}$ and $2^{nd}$ order temporal differences are concatenated, forming a 39-dimension feature vector. In order to decide whether an audio frame belongs to voice or noise, audio signals recorded in meeting rooms and offices are collected, and each audio frame is labeled as "voice" or "noise". This labeled data set is used for training.

The first step is to seek in the original D-dimensional feature space a low dimensional subspace, in which the two classes ("voice" and "noise") can be well discriminated. The most discriminative linear projection vector w* is determined by solving the equation:

$$w^* = \underset{w}{\operatorname{argmin}} \frac{w^T R_N w}{w^T [R_N + R_V + (m_N - m_V)(m_N - m_V)^T] w},$$

where $(m_N, R_N)$ and $(m_V, R_V)$ are the mean-covariance pairs of the noise class and voice class respectively, which are calculated from the training data. This optimization problem can be solved through generalized eigenvalue decomposition. It should be pointed out that d>1 generalized eigenvectors are picked, forming a D-by-d matrix W. The column vectors of W span a d-dimensional discriminative subspace (where, in one embodiment, d=10).

The likelihood of an audio frame belonging to the noise class is given by the equation:

$$p(x|noise) \propto \exp(\frac{1}{2}(x-m_N)^T K(x-m_N)),$$

where x is the D=39-dimensional feature vector for the audio frame, and $K = W(W^T R_N W)^{-1} W^T$ is a constant square matrix. The audio frame's voiceness component, which is also called a Feature-based VAS (FVAS), is defined as:

$$FVAS = (x-m_N)^T K (x-m_N). \quad (1)$$

Since it is a monotonically decreasing function of p(x|noise), a larger FVAS implies that the audio frame is less likely to be noise and more likely to be voice.

It should be noted that calculation of the voiceness component (or the FVAS) in equation (1) can be done fairly efficiently. An orthogonal diagonalization can be used such that $C = (W^T R_N W)^{-1} = U \Lambda^2 U^T$, where u is d-by-d orthogonal matrix and $\Lambda$ is diagonal. This can always be done, since C is positive semi-definite. Defining $H = (WU\Lambda)^T$, gives:

$$K = WU\Lambda^2 U^T W^T = H^T H \quad (2)$$

This allows equation (1) to be written as:

$$FVAS = \|Hx - \tilde{m}_N\|^2, \quad (3)$$

where $\tilde{m}_N = Hm_N$ is a d-dimensional constant vector. Equation (3) means that in order to calculate the FVAS, x need only be projected to d-dimensional through H, then calculate the Sum of Squared Differences (SSD) between the projected vector and constant vector $\tilde{m}_N$ in the d-dimensional subspace. The FVAS defined this way is able to effectively discriminate true voice and various noises, including high energy level noises, such as breathing, which cannot be suppressed using frame-energy based methods.

Energy Level Component Calculation and Normalization

If the audio signal does contain voice, then the next determination is how much energy is contained in (or how loud is) the voice. Typically, the loudness of the voice will indicate the level of energy that a person is exerting. Thus, although the voiceness component (or FVAS) can effectively differentiate voice and noises, it alone is not suitable for speaker selection since it does not directly reflect the speaker's volume.

In order to compensate for this deficiency of the FVAS, the energy level component of the VAS is introduced. The energy level component is also called "adaptively normalized frame energy", and is denoted as $\tilde{E}$. In one embodiment, normalization is used to level the playing field between the participants in a voice conference. This avoids a participant always being the primary speaker by turning up their microphone gain. In order to normalize, the peer-aware voice stream ranking method computes a long-term average of the energy. By way of example, if a participant's current voice energy is equal to the value of the long-term energy average, then their score is one. If the participant raises their voice, so that it is twice as much as the long-term energy average, then the participant's score is 2. In this manner, no matter how much that microphone gain is increased, each participant is given a level playing field.

Figure 3:
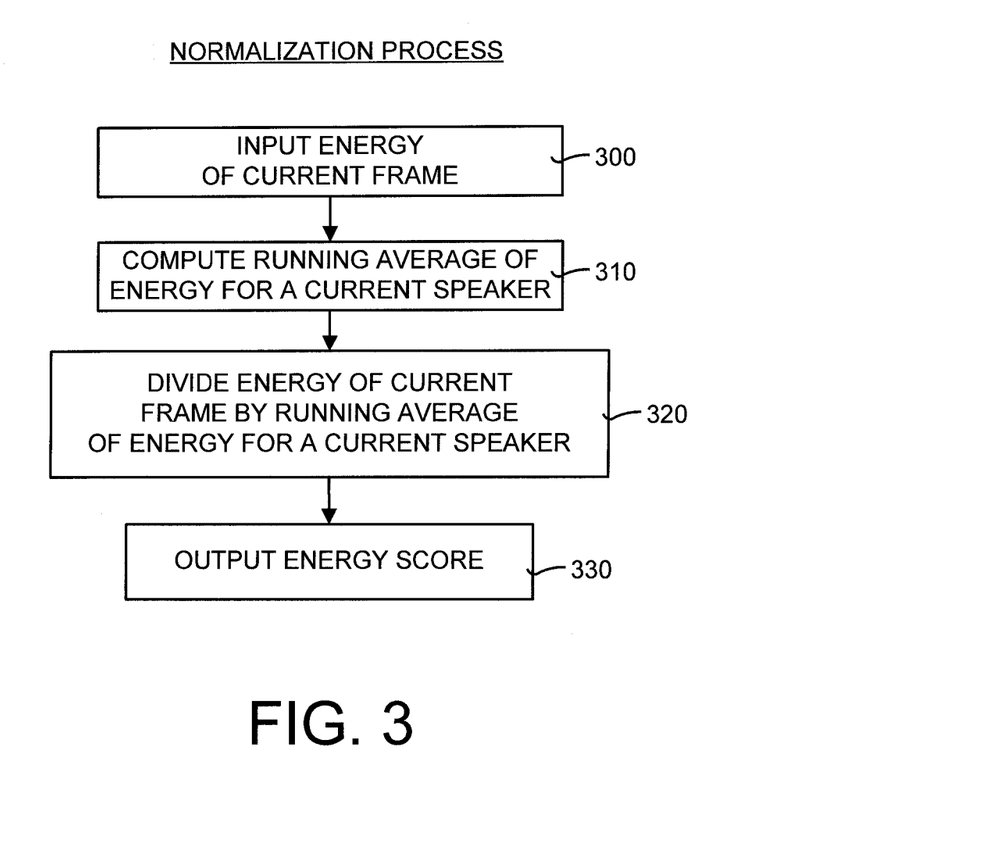
FIG. 3 is a detailed flow diagram illustrating the details of the normalization process shown in FIG. 2.

FIG. 3 is a detailed flow diagram illustrating the details of the normalization process shown in FIG. 2. In particular, the normalization process begins by inputting the computed energy of the current audio frame, E. (box 300). Next, the running average of the energy for a current speaker is computed (box 310). This running average, denoted as $\epsilon$, is the running average of voice energy. In other words, it is the average energy of the most recent audio frames that are classified as voice. By way of example, the average energy may be based on an audio frame having a time window of length $T_E = 15$ seconds.

The adaptively normalized frame energy, or energy score, $\tilde{E}$, is obtained by the equation $\tilde{E} = E/\epsilon$, which is dividing the energy of the current frame by the running average of energy for a current speaker. It is clear that $\tilde{E}$ is insensitive to the volume level because it is a normalized quantity and always varies around 1 for voice frames. On the other hand, a sudden increase in E will cause $\tilde{E}$ to increase sharply, but this relatively larger $\tilde{E}$ will last only for a short term till the running average $\epsilon$ follows the increase.

Calculation of a Preliminary VAS

A preliminary VAS is defined as a combination of the FVAS and $\tilde{E}$:

$$VAS = k\alpha \cdot \tilde{E} + (1-\alpha) \cdot FVAS \quad (4)$$

where the weight $\alpha$ is also a function of FVAS, defined as:

$$\alpha = [1 + \exp(b - c \cdot FVAS)]^{-1}. \quad (5)$$

Note that $0 \leq \alpha \leq 1$. In one embodiment, constants b and c in equation (5) are chosen so that for noise frames $\alpha \approx 0$ while for voice frames $\alpha \approx 1$. In another embodiment FVAS is used as VAS for noise frames. In yet another embodiment, for voice frames $k\tilde{E}$ is used. Here, the constant k is used to scale $\tilde{E}$ so that it is comparable with FVAS.

Filtering of the Preliminary VAS

In one embodiment of the peer-aware voice stream ranking method, a filtering process is used to avoid situations where the speaker ranking changes rapidly. For example, the audio signal containing voice can vary rapidly from one millisecond to the next, but it is undesirable for the speaker ranking to change that often. More specifically, the VAS should be smooth temporally. Smooth VAS is not only favored for accurate silence suppression and leads to less spurious speaker switching. More importantly, because each client can only compare its current VAS with a delayed version (due to network transmission) of the other participant's VAS, smooth VAS results in less decision discrepancy among clients.

Since the preliminary VAS is calculated separately for each frame, the correlation between neighboring frames has not been taken into account thus far, resulting in a quickly oscillating sequence. In one embodiment, the peer-aware voice stream ranking method smoothes this sequence through a nonlinear filtering operation:

$$VAS'[n] = \max_{k=0,1,\ldots,K}(VAS[n-k]), \quad (6)$$

which is a unilateral morphological dilation. The filtered VAS is much smoother, since the narrow valleys in the original VAS sequence are effectively eliminated. In alternative embodiments, more complex techniques (such as such as Hidden Markov Model (HMM)) may be used to model the correlation between neighboring frames.

Barge-In Mechanism

In one embodiment of the peer-aware voice stream ranking method, a participant who is currently speaking (or "has the floor") is given a slight benefit when considering whether to allow another participant to barge in. Instead of simply sorting the participants according to their VAS and selecting the top ranked M ones, the barge-in mechanism allows a participant to interrupt only if its VAS is higher than the current speaker's VAS by certain margin. This effectively gives preference to the current speaker. In order to barge-in, a participant must be ranked higher by a certain percentage than the current speaker.

Figure 4:
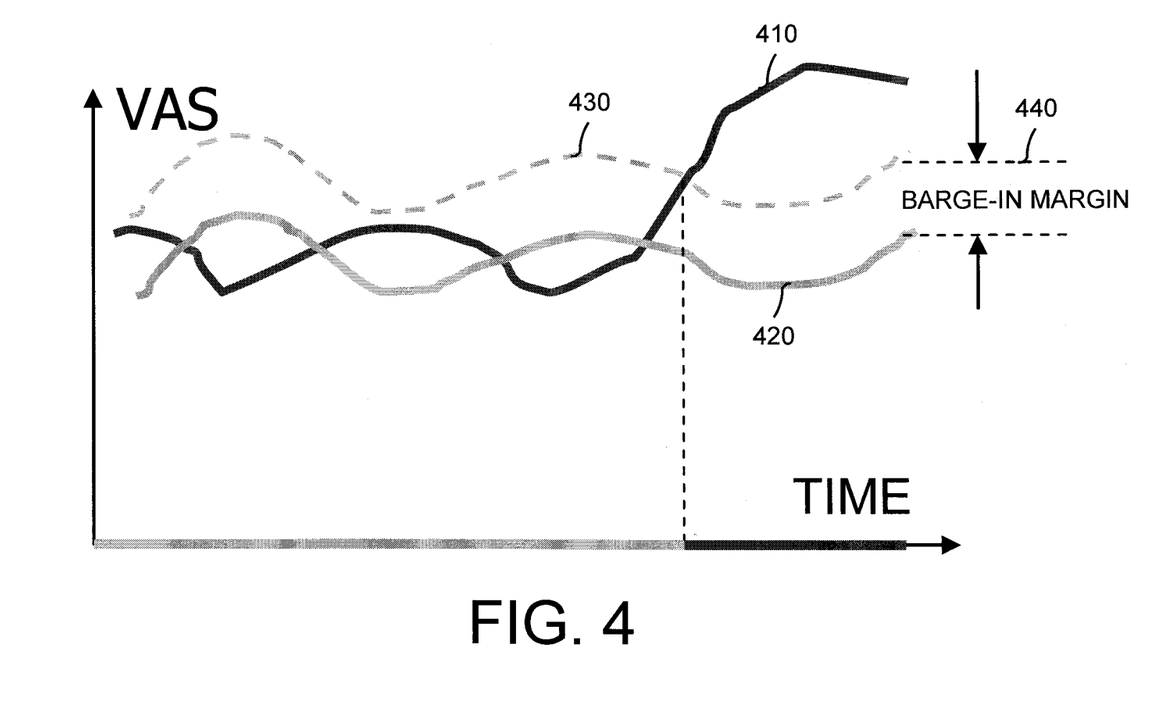
FIG. 4 illustrates the concept of the barge-in mechanism.

FIG. 4 illustrates the concept of the barge-in mechanism. The situation shown in FIG. 4 is where M=1 speaker is selected from N=2 clients. More specifically, a first client has a first VAS 410, and a second client (which is the current speaker) has a second VAS 420. As can be seen in FIG. 4, if the speaker with higher VAS is always selected, spurious speaker switching will happen frequently. In fact, there will be 5 switches.

The "barge-in" mechanism is an effective method to prevent this kind of spurious switching. As shown in FIG. 4, a barge-in threshold 430 is defined as the current speaker's VAS (in this case, the second VAS 420) plus a certain additional percentage of the current speaker's VAS 420. The interrupter (or first client) may suppress the current speaker (the second client) only if its VAS (the first VAS 410) is higher than the second VAS 420 by at least a margin, which is called the barge-in margin 440. Thus, the barge-in threshold 430 is defined as the current speaker's VAS 420 plus the barge-in margin 440. For the example shown in FIG. 4, by using the barge-in threshold there is only one switch between speakers, as compared with 4 switches when not using the barge-in process.

Figure 5:
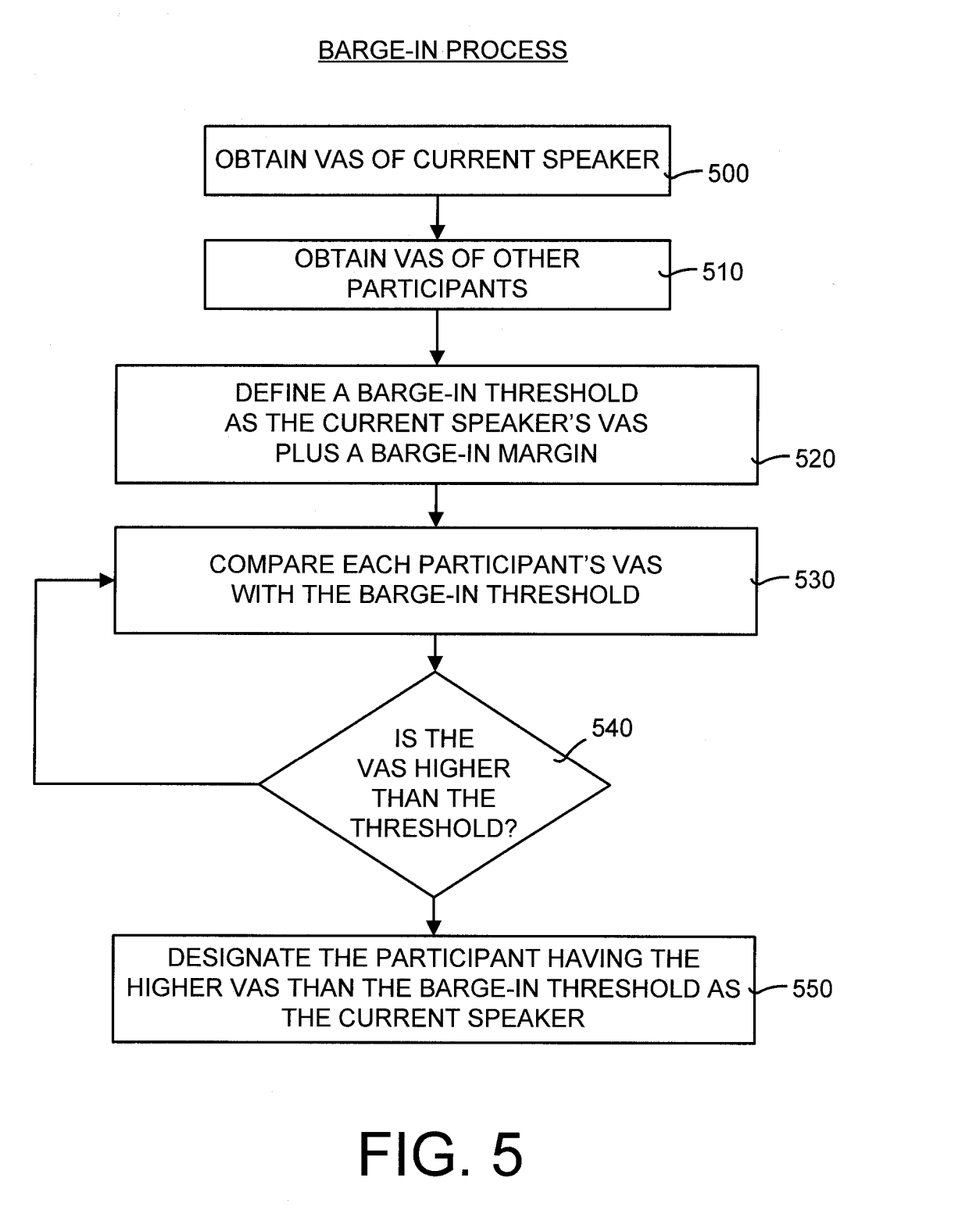
FIG. 5 is a detailed flow diagram illustrating the details of the barge-in mechanism shown in FIG. 4.

FIG. 5 is a detailed flow diagram illustrating the details of the barge-in process shown in FIG. 4. The VAS of a current speaker is obtained (box 500). Next, the VAS of other participants in the voice conference is obtained (box 510). The barge-in threshold then is defined as the current speaker's VAS plus a barge-in margin (box 520).

Each participant's VAS is compared with the computed barge-in threshold (box 530). For each participant, the VAS is compared to determine whether it is higher that the barge-in threshold (box 540). If so, then the participant is designated as a current speaker (box 550) and begins sending its own signal. If not, then for each audio frame, the process is repeated.

It should be noted that because of the delay in receiving other participants' scores, it may occur that more than M speakers will be simultaneously sending a signal at some point. This transient mode will not last very long, since as soon as the old active client start to receive the new stream, it will realize its own signal is now weaker and will cease transmission, at least for the moment.

Other Embodiments

Figure 6:
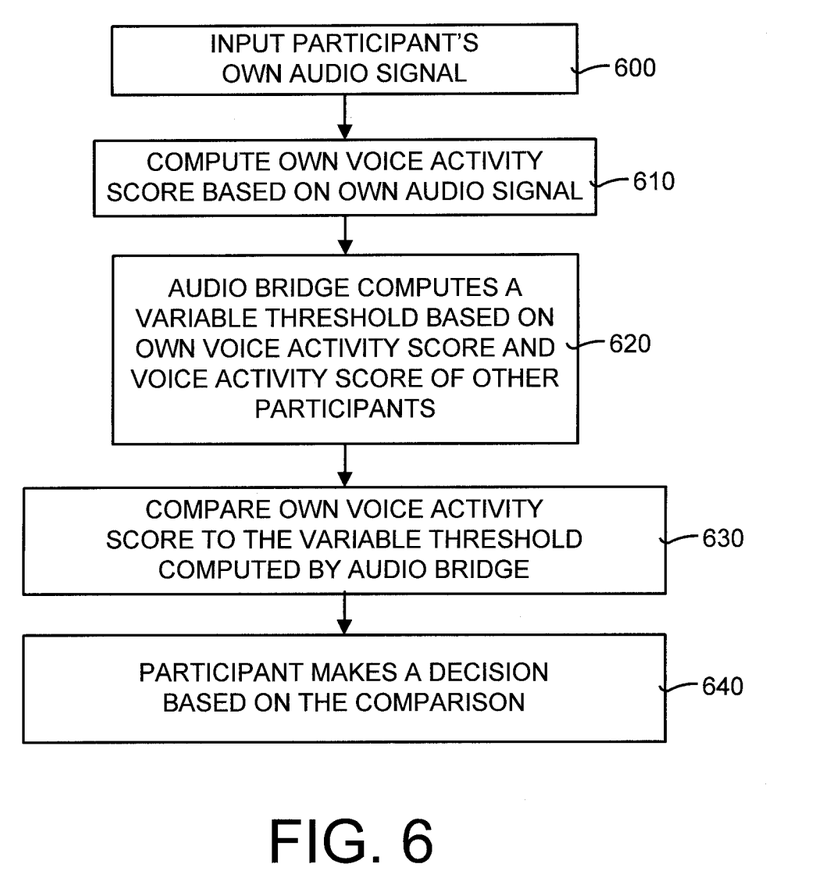
FIG. 6 is a general flow diagram illustrating the general operation of an alternate embodiment of the peer-aware voice stream ranking method.

In the embodiments discussed above, multiple audio streams are received by a participant in a voice conference and the participant's VAS is compared to other the VAS of other participants. FIG. 6 is a general flow diagram illustrating the general operation of an alternate embodiment of the peer-aware voice stream ranking method. In general, in this alternate embodiment, an audio bridge (or server) computes a send/no send threshold based on the participant's VAS and the VAS of the other participants. This send/no send threshold is a variable threshold, and is can be based not only on the participant's VAS and the VAS of the other participants, but also on other factors such as the load on the audio bridge. The send/no send threshold determines whether the participant client will send its own audio signal out on the network or suppress its audio signal.

In particular, referring to FIG. 6, the participant's own audio signal is input (box 600). The VAS of the participant is computed based on its own audio signal (box 610). Next, the audio bridge computes the send/no send threshold based the VAS of the participant and the VAS of the other participants (box 620). In one embodiment, the bridge also decides the send/no send threshold based on the load on the bridge. Thus, if the bridge has a high load, then the threshold can be set higher. A high load on the bridge may occur if a particular voice conference has many participants, if the are several simultaneous conferences occurring, or both.

The participant's client compares its own VAS to the variable threshold computed by the audio bridge (box 630). A decision is made by the participant based on the comparison (box 640). By way of example, the decision made may be whether or not to send the participant's audio signal.

III. Exemplary Operating Environment

The peer-aware voice stream ranking method is designed to operate in a computing environment. The following discussion is intended to provide a brief, general description of a suitable computing environment in which the peer-aware voice stream ranking method may be implemented.

Figure 7:
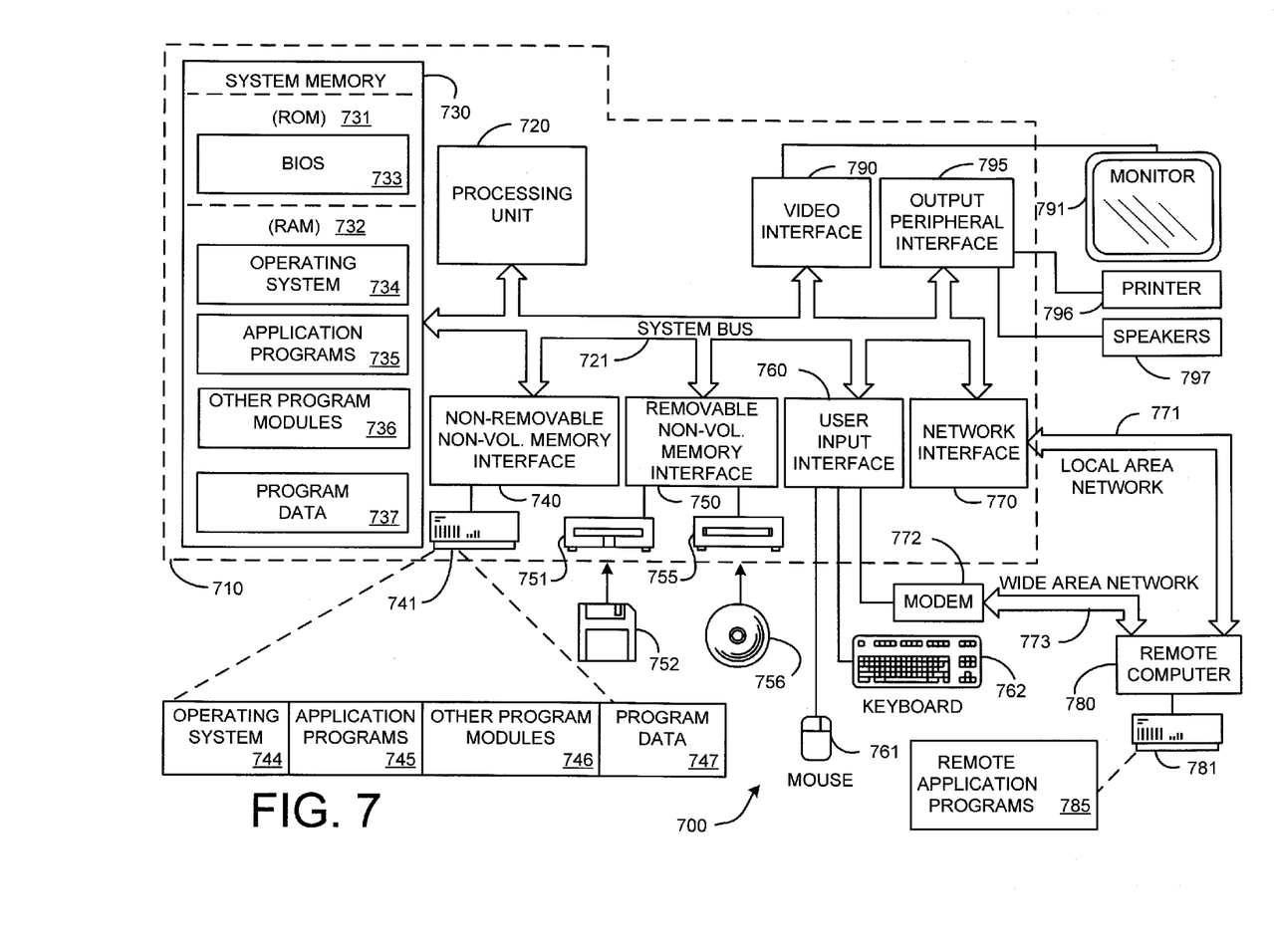
FIG. 7 illustrates an example of a suitable computing system environment in which the peer-aware voice stream ranking method may be implemented.

FIG. 7 illustrates an example of a suitable computing system environment in which the peer-aware voice stream ranking method may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment.

The peer-aware voice stream ranking method is operational with numerous other general purpose or special purpose computing system environments or configurations. Examples of well known computing systems, environments, and/or configurations that may be suitable for use with the peer-aware voice stream ranking method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The peer-aware voice stream ranking method may be described in the general context of computer-executable instructions, such as program modules, being executed by a computer. Generally, program modules include routines, programs, objects, components, data structures, etc., that perform particular tasks or implement particular abstract data types. The peer-aware voice stream ranking method may also be practiced in distributed computing environments where tasks are performed by remote processing devices that are linked through a communications network. In a distributed computing environment, program modules may be located in both local and remote computer storage media including memory storage devices. With reference to FIG. 7, an exemplary system for peer-aware voice stream ranking method includes a general-purpose computing device in the form of a computer 710.

Components of the computer 710 may include, but are not limited to, a processing unit 720 (such as a central processing unit, CPU), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer readable media. Computer readable media can be any available media that can be accessed by the computer 710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. Communication media typically embodies computer readable instructions, data structures, program modules or other data in a modulated data signal such as a carrier wave or other transport mechanism and includes any information delivery media. Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within the computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 720 through a user input interface 760 that is coupled to the system bus 721, but may be connected by other interface and bus structures, such as, for example, a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for performing silence suppression in a computer network voice conference having a plurality of participants, comprising:
    obtaining voice activity scores computed on an ongoing basis from a combination of a computed energy of one or more sequential frames of a local participant's audio signal and a voiceness score computed from the corresponding sequential frames;
    providing each computed voice activity score of the local participant's audio signal to one or more remote participants;
    obtaining voice activity scores from one or more of the remote participants, each voice activity score being computed on an ongoing basis from a computed energy of one or more sequential frames of audio signals of the remote participants; and
    wherein any of the participants evaluate each voice activity score obtained from any other participants relative to their own voice activity scores to make ongoing independent decisions as to whether to transmit one or more sequential audio signal frames to each of the other participants.

2. The method of claim 1, wherein there are at least two remote participants.

3. The method of claim 1, wherein the voiceness scores indicate a likelihood that particular audio frames contains speech.

4. The method of claim 1, wherein when making the decision as to whether to transmit, each participant compares its current voice activity score with a delayed version of the voice activity scores of the remainder of the participants.

5. The method of claim 4, further comprising computing a speaker ranking of the local participant relative to the remainder of the participants based on the voice activity scores of the local and remote participants.

6. The method of claim 5, wherein the decisions as to whether to transmit include how much bandwidth to allot to each participant based on each participant's speaker ranking.

7. The method of claim 5, further comprising computing a preliminary voice activity score of the local participant by combining a voiceness score, which indicates the likelihood that the local participant's audio signal contains speech or voice, and an energy score, which determines an amount of energy contained in the voice.

8. The method of claim 7, further comprising filtering the preliminary voice activity score to avoid situations where the speaker ranking changes frequently.

9. The method of claim 7, further comprising normalizing the energy score by dividing a current energy of an audio frame of the local participant's audio signal by a long-term average energy for one of the participants who is a current speaker.

10. The method of claim 1, further comprising designating a participant having a voice activity score that exceeds the voice activity score of a current speaker by more than a barge-in margin as a next current speaker.

11. The method of claim 1, further comprising using an audio bridge on the computer network to compute a variable threshold based on the voice activity score of the local participant and the voice activity scores of the remainder of the participants.

12. The method of claim 11, further comprising:
    comparing the first voice activity score to the variable threshold; and
    having the local participant make a decision based on the comparison.

13. A computer-readable storage device having stored thereon computer-executable instructions for performing silence suppression on a client device connected to a network in a voice conference having a plurality of participants, comprising:
    computing a local voice activity score on an ongoing basis from a combination of a computed energy of one or more sequential frames of a local participant's audio signal and a voiceness score computed from the corresponding sequential frames;
    providing the local voice activity score to a plurality of remote participants;
    obtaining voice activity scores of the remote participants; and
    having any of the participants make an independent decision based on the local participant's voice activity score and the voice activity scores of the remainder of the participants whether to send that participants own audio signal out on the network.

14. The computer-readable storage device of claim 13, further comprising:
    computing Mel-Frequency Cepstral Coefficients for each audio frame of the participant's audio signal;
    obtaining, energy of a current audio frame from the Mel-Frequency Cepstral Coefficients computation;
    computing a running average of energy for a current speaker in the voice conference; and
    normalizing the current audio frame energy by dividing the energy of the current audio frame by the running average of energy for the current speaker to obtain an energy score.

15. The computer-readable storage device of claim 14, further comprising:
    obtaining a current voice stream ranking of the voice conference;
    combining a voiceness score and the energy score to obtain a preliminary voice activity score;
    filtering the preliminary voice activity score to temporally smooth the preliminary voice activity score to avoid spurious changes in the voice stream ranking.

16. The computer-readable storage device of claim 13, further comprising:
    obtaining a voice activity score of a current speaker in the voice conference;

defining a barge-in threshold as the current speaker's voice activity score plus a barge-in margin;

comparing each participant's voice activity score with the barge-in threshold; and designating the participant having a voice activity score that is higher that the barge-in threshold as a new current speaker.

17. The computer-readable storage device of claim 13, wherein when making the decision as to whether to send the participants own audio signal out on the network, each participant compares its current voice activity score with a delayed version of the voice activity scores of the remainder of the participants.

18. A computer-implemented process for ranking multiple voice streams in a voice conference over a computer network, comprising using a computer to perform process actions for:

computing a client voice activity score based on a client's voice stream, wherein the client is in communication with the network;

wherein the voice activity score is computed on an ongoing basis from a combination of a computed energy of one or more sequential frames of the client's voice stream and a voiceness score computed from the corresponding sequential frames;

computing a variable threshold using an audio bridge in communication with the network using the client voice activity score and voice activity scores of the remote participants in the voice conference;

using the client to compare the client voice activity score to the variable threshold; and causing the client and any of the remote participants to make an independent decision on whether to transmit their voice stream based on the comparison.

19. The computer-implemented process as set forth in claim 18, wherein computing the variable threshold is based at least in part on, a load on the audio bridge, such that if the audio bridge has a high load, then the variable threshold is set higher.

20. The computer-implemented process as set forth in claim 18, further comprising designating a participant having a voice activity score that exceeds the voice activity score of a current speaker by more than a barge-in margin as a next current speaker.

* * * * *